Patented Sept. 3, 1946

2,407,177

UNITED STATES PATENT OFFICE 2,407,177

SULPHONAMIDE DERIVATIVES OF MELAMINE AND PROCESSES FOR THEIR PRODUCTION

Richard O. Roblin, Jr., Old Greenwich, and Philip S. Winnek, Riverside, Conn., assignors to American Cyanamid Company, New York, N. Y., a corporation of Maine No Drawing. Application July 31, 1942, Serial No. 453,100

8 Claims. (Cl. 260—239.6)

This invention relates to a new class of chemical compounds and methods for their preparation. More particularly it relates to sulphonamide derivatives of melamine.

This new class of chemical compounds may be represented by the following formula:

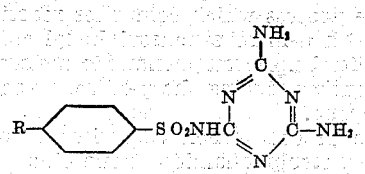

in which R represents an amino group or a group reducible to an amino group including nitro groups.

Some of the compounds of this invention have bactericidal properties and hence may be used for that purpose. They may also be used as intermediates for the preparation of other compounds such as pharmaceuticals and particularly azo dyestuffs.

Compounds of the present invention, in general, may be prepared by reacting a p-nitrobenzenesulphonyl halide with melamine. These reaction products may then be converted into the compounds of the general formula in which R is an amino group by reduction. Preferably the reaction between melamine and the sulphonyl halide is carried out in a medium comprising an organic liquid, such as acetone, isopropyl alcohol, tertiary butyl alcohol, dioxane, or the like. In this reaction a hydrogen halide is liberated and in some instances it may be desirable to provide a basic reaction medium which will react with the hydrogen halide evolved. This may be effected by carrying out the reaction in a suitable medium and adding an excess of sodium hydroxide or other alkali metal hydroxide. In some instances the reaction can be carried out in the presence of a basic reaction medium, such as pyridine, trimethylamine, or quinoline, in which case it is not necessary to add an alkali hydroxide.

The invention will be described more fully in conjunction with the following specific examples. It should be understood, however, that the examples are given by way of illustration only and the invention is not to be limited by the details set forth therein. The parts are by weight except in the case of liquids which are expressed in parts by volume.

EXAMPLE 1

2-(p-nitrobenzenesulphonamido)-4,6-diamino-1,3,5-triazine

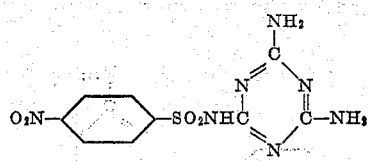

Twenty-five parts of 2,4,6-triamino-1,3,5-triazine are suspended in 100 parts of anhydrous pyridine and 30 parts of p-nitrobenzenesulphonyl chloride are added gradually with stirring and with the temperature maintained between 60°–70° C. One hundred parts more of anhydrous pyridine are added and stirring continued one-half hour without further heating. Six hundred parts of water are added and the mixture filtered. The filtrate on standing precipitates a yellow precipitate of 2-(p-nitrobenzenesulphonamido)-4,6-diamino-1,3,5-triazine. It is purified by dissolving in dilute sodium hydroxide and treating the solution with activated charcoal. After filtering the product is precipitated from the filtrate with dilute acetic acid.

EXAMPLE 2

2-sulphanilamido-4,6-diamino-1,3,5-triazine

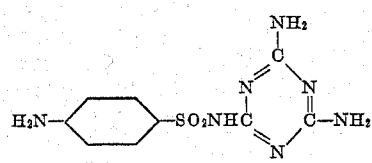

Five parts of 2-(p-nitrobenzenesulphonamido)-4,6-diamino-1,3,5-triazine are added to a suspension of ten parts of iron dust in 100 parts of 1% acetic acid and the mixture stirred and heated on a steam bath under reflux overnight. The reaction mixture is made alkaline and filtered hot. The filtrate is neutralized with dilute hydrochloric acid and the 2-sulphanilamido-4,6-diamino-1,3,5-triazine separates as a white solid. It is purified by repeated crystallization from hot water.

In Example 1 above p-nitrobenzenesulphonyl chloride was used in carrying out the reaction. The chloro compound is preferred, but it is to be understood that instead thereof the corresponding sulphonyl bromides may be employed.

When desired, the alkali metal, alkaline earth metal, or other metal salts of sulphanilyl melamine may be prepared in accordance with the procedures normally employed for preparing salts of sulphonamides. The alkali metal and alkaline earth metal salts, for example, may be prepared by direct treatment with the appropriate alkali metal or alkaline earth metal hydroxide. The alkali metal salts may then, if desired, be converted into salts of the heavy metals, such as iron, copper, gold, etc., by treatment with water-soluble inorganic salts of the appropriate metal.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. A compound of the group consisting of those represented by the following formula and salts thereof:

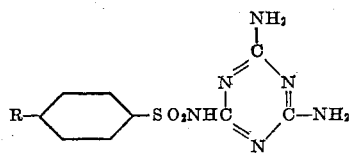

in which R is a member of the group consisting of amino radicals and radicals reducible to an amino group.

2. The compound represented by the following formula:

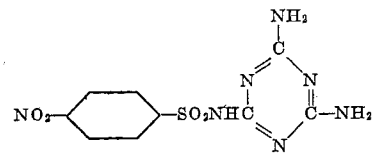

3. The compound represented by the following formula:

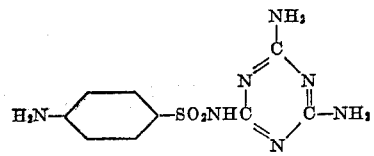

4. The process which comprises reacting melamine with a p-nitrobenzenesulphonyl halide to give p-nitrobenzenesulphonamido melamine.

5. The process which comprises reacting melamine with a p-nitrobenzenesulphonyl halide to give p-nitrobenzenesulphonamido melamine and subsequently reducing the p-nitro group to a p-amino group.

6. The process which comprises reacting melamine with p-nitrobenzenesulphonyl chloride to give p-nitrobenzenesulphonamido melamine.

7. The process which comprises reacting melamine with p-nitrobenzenesulphonyl chloride to give p-nitrobenzenesulphonamido melamine and subsequently reducing the p-nitro group to a p-amino group.

8. The process which comprises reducing p-nitrobenzenesulphonamido melamine to give sulphanilyl melamine.

RICHARD O. ROBLIN, Jr.
PHILIP S. WINNEK.